United States Patent [19]

Neufeld

[11] Patent Number: 4,949,536
[45] Date of Patent: Aug. 21, 1990

[54] LAWN AND GARDEN TRIMMER APPARATUS

[76] Inventor: George Neufeld, 1978 - 134A Street, Surrey, B.C., Canada, V4A 6B6

[21] Appl. No.: 375,993

[22] Filed: Jul. 6, 1989

[51] Int. Cl.$^5$ .............................................. A01D 34/84
[52] U.S. Cl. .................................... 56/13.7; 56/16.9; 56/256
[58] Field of Search ...................... 56/12.7, 13.7, 13.8, 56/15.2, 15.5, 16.9, 17.1, 234, 235, 251, 256, DIG. 17; 74/89.15

[56] References Cited

U.S. PATENT DOCUMENTS

| | | | |
|---|---|---|---|
| 3,304,700 | 2/1967 | Barber | 56/13.7 X |
| 4,328,660 | 5/1982 | Simmons | 56/12.7 |
| 4,453,372 | 6/1984 | Remer | 56/13.7 |
| 4,546,601 | 10/1985 | Skovhoj | 56/6 X |
| 4,718,221 | 1/1988 | Wessel et al. | 56/16.9 |
| 4,802,374 | 2/1989 | Hanelin et al. | 74/89.15 X |
| 4,825,714 | 5/1989 | Yamanaka et al. | 74/89.15 X |
| 4,841,790 | 6/1989 | Williston et al. | 74/89.15 X |

Primary Examiner—William P. Neuder
Attorney, Agent, or Firm—Schlesinger & Myers

[57] ABSTRACT

A lawn and garden trimmer apparatus includes a framework with means for mounting the framework to a lawn mower body, a guide rail supported between opposed sides of the framework, a carrier bracket moveably mounted on the rail, a support arm pivotally mounted to the bracket, and a trimmer assembly mounted to the outer end of the support arm. Through a combination of rotational and linear degress of freedom, the trimmer assembly may be located at various positions and angular attitudes relative to the lawn mower body.

7 Claims, 6 Drawing Sheets

LAWN AND GARDEN TRIMMER APPARATUS

FIELD OF THE INVENTION

This invention relates to apparatus used to maintain lawns and gardens, and in particular to lawn and garden cutting, trimming or edging apparatus. Herein, the abbreviated term "lawn trimmer" is used from time-to-time, it being understood that the utility of the apparatus is not confined to lawns, but extends to gardens and similar vegetation.

BACKGROUND TO THE INVENTION

Conventional lawn mowers designed to cut a relatively wide swath across grass have existed for a considerable length of time. Likewise, devices specifically designed to clean up rough edges left by a conventional mower, or not readily accessible by a conventional mower, have existed for a significant period of time. Devices of the latter kind are commonly referred to as lawn trimmers or lawn edgers.

The fact has been recognized that advantages may flow from combining features of a lawn trimmer with a lawn mower. For example, U.S. Pat. No. 4,653,254 granted to Qualls on March 31, 1987, discloses a lawn trimmer apparatus and mower combination in which the trimmer apparatus derives operating power from the lawn mower engine. However, the essential feature of the Qualls design appears to be the power take-off mechanism. The trimmer apparatus per se is otherwise designed to be hand held and controlled much like a conventional stand-alone lawn trimmer. The lawn mower does not assist positioning and control of the trimmer.

An example where a lawn mower is used to assist the positioning and control of a lawn trimmer is disclosed in U.S. Pat. No. 4,453,372 granted to Remer on June 12, 1984. Remer discloses a trimmer assembly which is mounted to one side of a lawn mower body by means of a universal or ball joint, and in which a trimmer head is mounted at the end of a telescoping arm from the ball joint, and the head may be rotated to cut in a horizontal or vertical plane (or in between) at that end. However, although the Remer design permits positioning of the trimmer head either by moving the lawn mower or by rotating or extending the telescoping arm, the extent of manipulative control is limited. The control is primarily rotational and radial relative to a fixed point on the lawn mower body and, as noted above, it is oriented to one side of that body. In the result, a substantial amount of "jockeying" of the lawn mower will be required to achieve some cutting operations. The severity of this disadvantage is more limited with a relatively small push-type power mower as is shown in the patent to Remer. In most cases, the user can quickly move the entire mower back and forth and he can quickly turn the entire mower from one direction to another. However, these kinds of movements become more difficult with larger machines such as riding mowers and the requirement for an undue amount of "jockeying" becomes an aggravated disadvantage.

A riding mower which also includes a lawn trimmer apparatus is disclosed in U.S. Pat. Nos. 4,546,601 and 4,663,920 granted to Skovhoj on Oct. 15, 1985, and May 12, 1987, respectively. As in the case of Remer, the movement of the trimmer assembly is rotational relative to a fixed point on one side of the mower body. However, instead of controlling the reach of the trimmer assembly with a telescoping arm, Skovhoj uses an articulated boom mechanism which appears sized to extend on either side and in front of the mower. The boom mechanism is undoubtedly workable. However it would be mechanically cumbersome and appears difficult to manipulate and position with a high degree of precision. In order to reach from one side of the lawn mower body to the other, the boom is lengthy and the trimmer head will be susceptible to a significant degree of bounce at the end of the boom. Further, to trim along a straight line in advance of the mower would require the operator to extend or retract the boom while simultaneously rotating the boom (the same would be true in the case of Remer).

It is an object of the present invention to provide a new and improved lawn trimmer apparatus to be carried by a lawn mower.

A more specific object of the present invention is to provide a lawn trimmer apparatus which, when carried by a lawn mower, enables the user to perform trimming operations over a broad sweep with improved means for positioning a trimmer head in relation to the lawn mower body.

In a broad aspect of the present invention, there is provided a lawn and garden trimmer apparatus comprising a supporting framework and means for mounting the framework to a lawn mower body. A guide rail with a carrier bracket moveably mounted thereon is supported longitudinally between opposed sides of the framework, the carrier bracket serving as a pivotal base connection for a support arm which carries a lawn trimmer assembly at its outer end. The trimmer assembly may thus be positioned not only by rotation of the support arm in relation to the carrier bracket, but also by linear movement of the carrier bracket along the length of the guide rail. The framework and the guide rail advantageously extend across the full front width of the mower permitting trimming operations in advance and on either side of the mower. Although such trimming operations may be generally achieved with a design such as that of Skovhoj, the absence of a fixed position base in the case of the present invention enables the use of a relatively short pivotable support arm (viz. compared to the boom assembly of Skovhoj) while maintaining a substantial area of positioning and cutting sweep for the trimmer assembly.

Further, and as will become more apparent hereinafter, the invention may be implemented with a compact, low profile configuration with the trimmer assembly, including its supporting framework, distanced away from the user without the necessity for a lengthy support arm or boom to achieve the desired reach. In the case of a reel type mower, the supporting framework for the trimmer assembly may be advantageously integrated with framework used to support the reel (or reels).

The present invention is considered to be particularly suitable for use with riding mowers in that it reduces the need to "jockey" the entire mower for some trimming operations. However, it may also be used with push type mowers.

The foregoing and other features and advantages of the invention will now be described with reference to the drawings.

DETAILED DESCRIPTION

Figure 1:
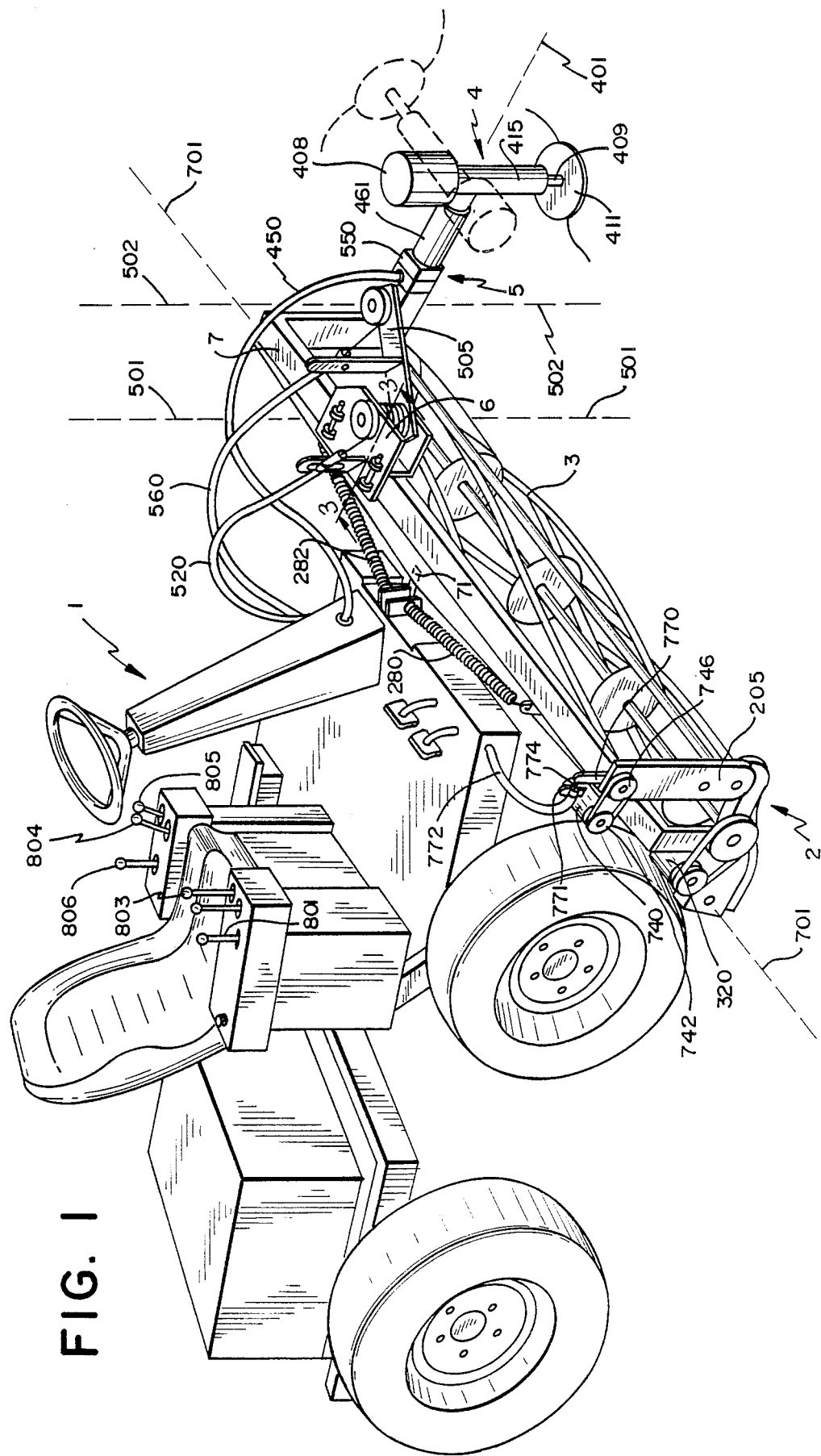
FIG. 1 is a perspective view of a lawn and garden trimmer apparatus integrated with a riding lawn mower.

FIG. 1 illustrates a riding lawn mower generally designated 1 which includes mounted at its front end framework generally designated 2, the latter of which supports both a mower reel 3 and a trimmer assembly generally designated 4. The support which framework 2 provides for trimmer assembly 4 is indirect, the assembly being pivotally mounted at the outer end of an articulated support arm generally designated 5, the inner end of arm 5 in turn being pivotally mounted to a carrier bracket 6 moveably mounted on guide rail 7, the latter of which is supported longitudinally between opposed sides of the framework.

As described hereinafter in more detail, there are several degrees of freedom characteristic of the arrangement shown in FIG. 1. Briefly, however, it may be noted here that trimmer assembly 4 is rotatable about a trimmer assembly axis 401. The whole of support arm 5 is pivotable at its inner end about support arm axis 501 and, as well, the support arm articulates about axis 502 parallel to axis 501. (It will be observed that axis 401 is transverse to axes 501 and 502.) Freedom that enables linear positioning of carrier bracket 6 (and necessarily support arm 5 and trimmer assembly 4) is provided along the length of guide rail 7, the rail itself being pivotable about longitudinal rail axis 701. In addition, the vertical height of framework 2 may be raised and lowered in relation to the lawn mower body.

Figure 2:
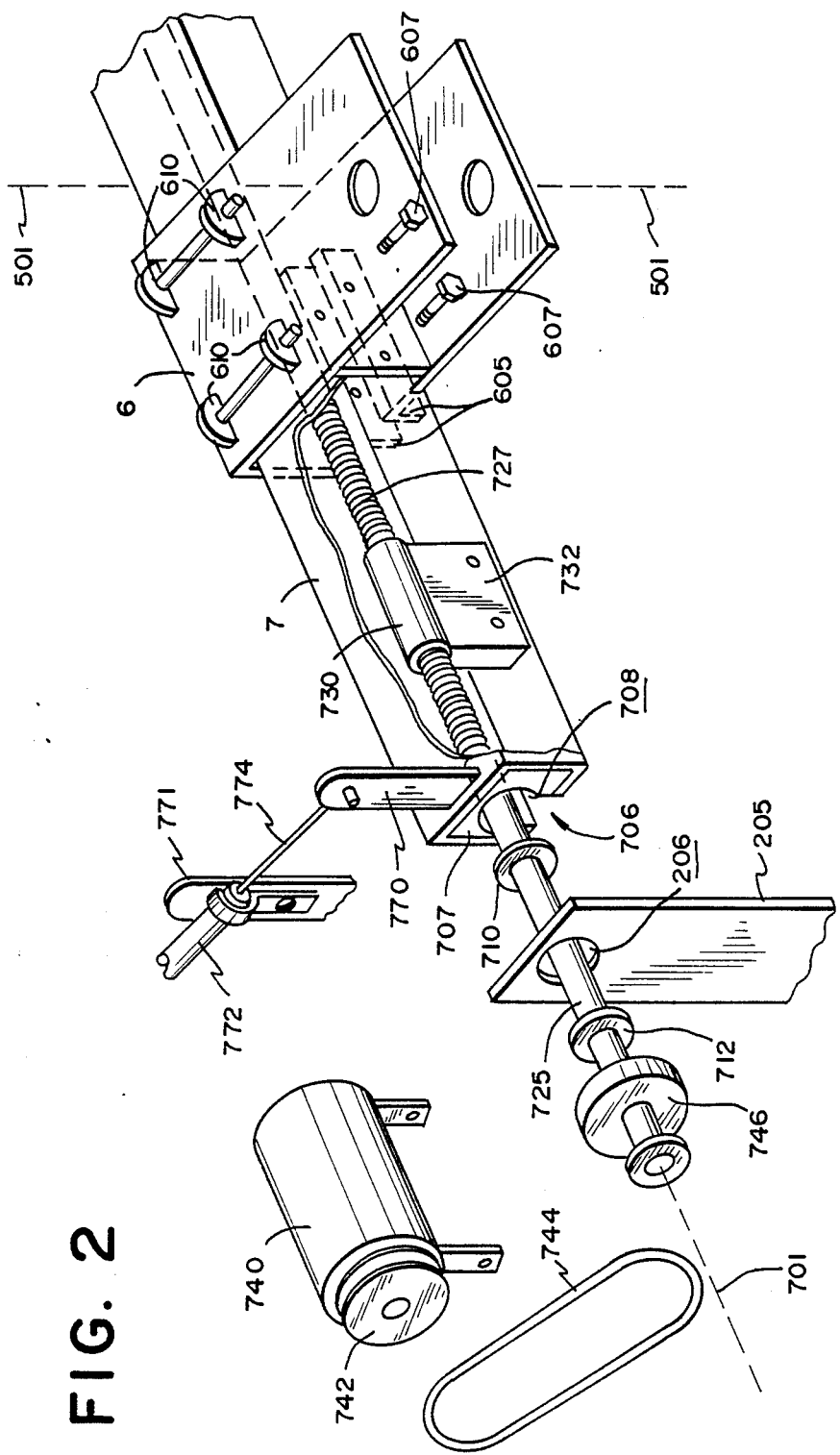
FIG. 2 is a perspective view, partially exploded, and partially cut-away, of the rail and carrier bracket assembly forming part of the apparatus in FIG. 1.
Figure 3:
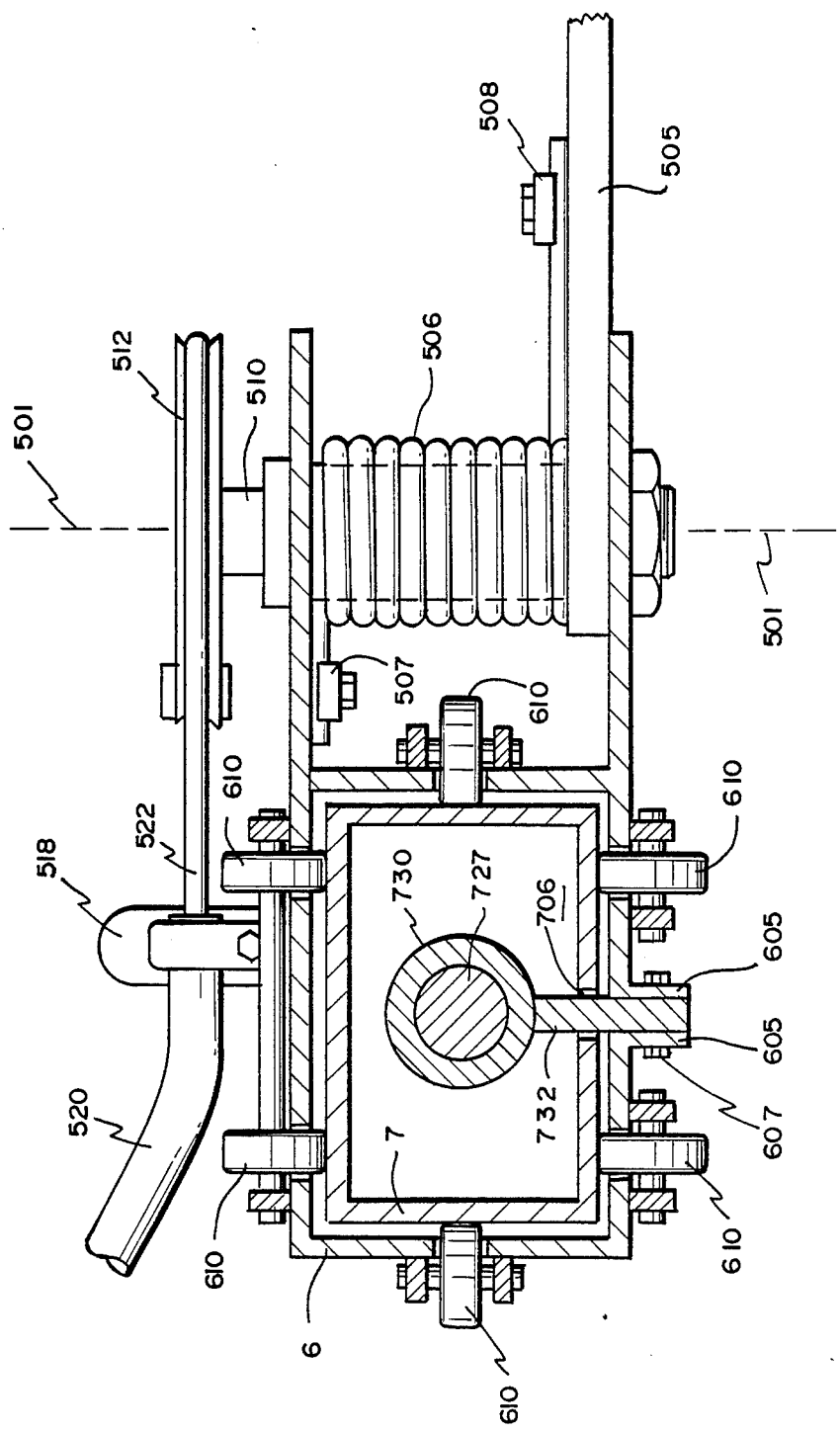
FIG. 3 is a section view, partially cut-away taken along section line 3—3 in FIG. 1.

Rail 7 is a tubular member and, as is best shown in FIGS. 2 and 3, has a generally rectangular cross-section except for slot 706 that travels the length of the rail. Each end of rail 7 includes an end plate 707 (only one being shown in the Figures), and each such plate includes a circular opening 708 designed to ride on a support bearing 710, the latter of which is mounted on elongated shaft 725. Shaft 725 itself is supported by and rides at each end on a support bearing 712 mounted in opening 206 of side plate 205 forming part of framework 2. (It should be noted that this detail appears only in FIG. 2 which has been partially exploded and cut-away for purposes of illustration. Essentially the same structure appears on the opposed side of the assembly which is not shown.)

At one end only of rail 7, a bracket 770 extends upwardly where it is engaged by the cable wire 774 of a conventional bowden wire control line 772 connected to and operated in a conventional way by control lever 801. As can be seen in FIG. 1, the end of line 772 nearest rail 7 is provided with holding support by a bracket 771 mounted off the rail.

The retraction or extension of wire 774 will cause rail 7 to rotate about axis 701. Carrier bracket 6, mounted on rail 7, will necessarily rotate with the rail.

Shaft 725 includes an elongated central threaded portion 727 which runs substantially the length of rail 7 and governs the distance that carrier plate 6 may travel back and forth along the rail. For the purpose of controlling such travel carrier plate 6 includes a pair of lower flanges 605 which abut below slot 706 on either side of lower extension 732 of carrier nut 730. In FIG. 2, nut 730 and carrier plate 6 are shown distanced away from each other. Normally, however, and as indicated in FIG. 3, these elements are aligned with each other and secured together by bolts 607.

Carrier nut 730 is threadingly engaged on threaded portion 727 of shaft 725. Its motion is limited to linear travel along the threaded portion of the shaft as the shaft is rotated. Obviously, nut 730 cannot itself rotate with rotation of shaft 725 because such movement is precluded by the coupling with carrier plate 6 (and would be blocked by contact with rail 7 if such coupling did not exist).

Thus, as shaft 725 is rotated, carrier plate 6 riding on rail 7 and coupled to the shaft by nut 730 will travel back and forth with the nut depending on the direction of shaft rotation. To minimize friction and improve the smoothness of travel on the rail, carrier plate 6 is supported against the rail by twelve rollers 610 (four on top, four on the bottom, and two on each side of the rail).

Rotation of shaft 725 occurs about axis 701 and is controlled by motor 740 mounted on framework 2. Motor 740 is a conventional variable speed reversible electric motor and includes a pulley output 742 coupled by means of belt 744 to pulley 746 on shaft 725. In a conventional manner not shown motor 740 is wired through lever 803 to derive operating power from an engine generator carried by mower 1, lever 803 controlling the operation and direction of rotation of the motor.

In addition to illustrating the mounting of carrier 6 on rail 7, FIG. 3 also illustrates the pivotal mounting of primary arm 505 of support arm 5 to the carrier. See also FIG. 4. Primary arm 5 is mounted in a position which allows about 180° of rotational movement about axis 501 in relation to spring loaded shaft 510. The shaft couples with primary arm 505 by a mating milled slot and blade arrangement as best seen in FIG. 4.

As viewed from the operator's position on mower 1, spring 506 (which is secured at one end to carrier bracket 6 by a bracket 507 and at the other end to primary arm 505 by a bracket 508) biases arm 505 to the extreme left. However, the actual position is controllable from left to right and positions in between with a bowden wire control line 520. As shown in FIGS. 3 and 4, control line 520 is supported at one end by a bracket 518 attached to carrier 6. Cable wire 522 of line 520 engages pulley 512 carried at the upper end of shaft 510. The other end of control line 520 (not shown) is coupled to and operated in a conventional way by control lever 804 (see FIG. 1).

Figure 4:
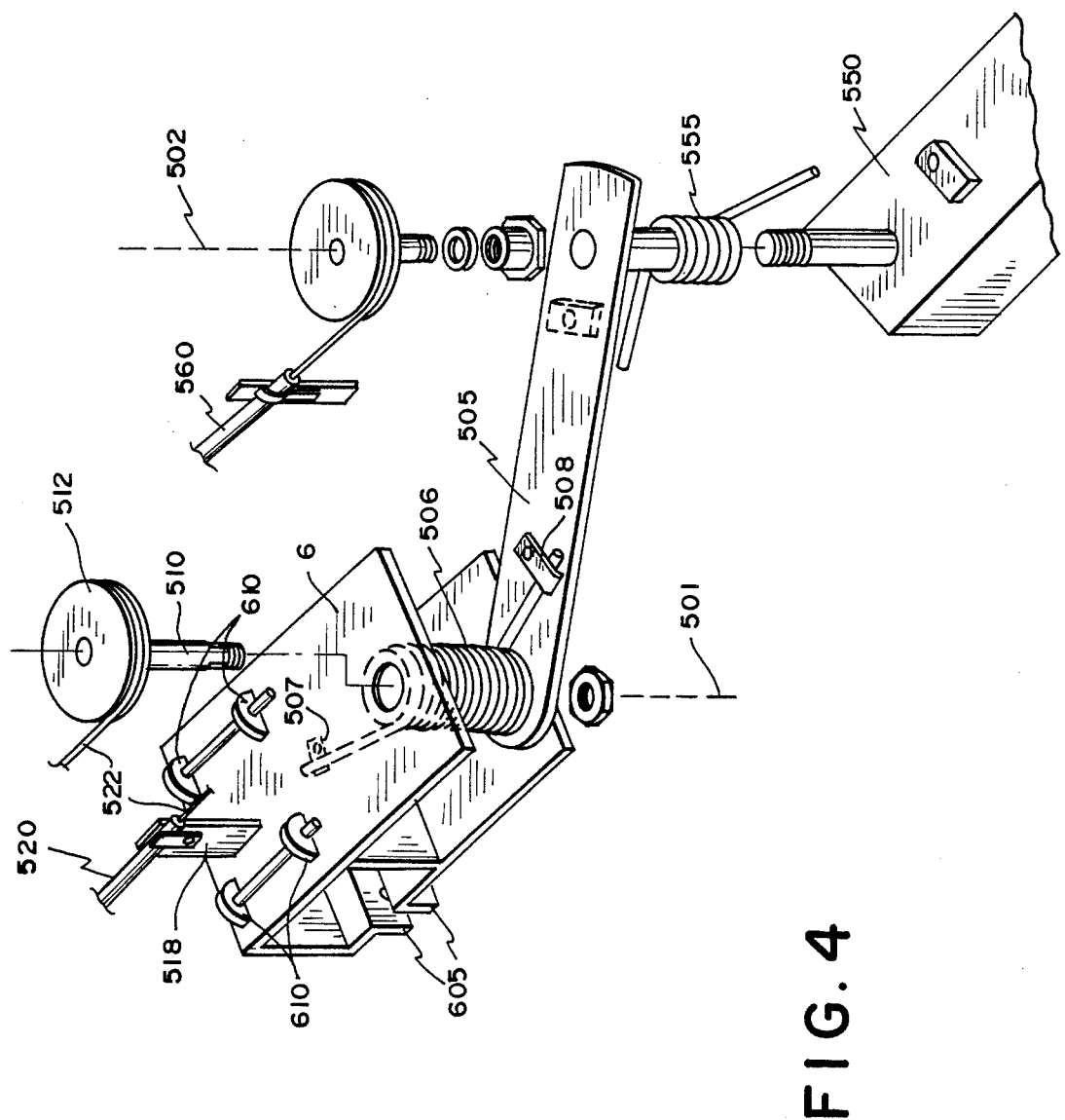
FIG. 4 is an exploded perspective view, partially cut-away, of the carrier bracket and support arm assembly forming part of the apparatus in FIG. 1.

The pivotal mounting of secondary or articulated arm 550 to primary arm 505 of support arm 5 is best illustrated in FIG. 4. The coupling is spring loaded utilizing spring 555. The relative rotational position of arm 550 in relation to arm 505 is controlled by a conventional bowden wire control line 560 operated by the positioning of lever 805 (FIG. 1).

The articulation of support arm 5 is not considered to be essential but it is considered to be advantageous and desirable to enable more freedom of control for the cutting angle of the trimmer head. Although this cutting angle is primarily determined by the angle of rotation of the trimmer head about axis 401, the resulting alignment can nevertheless be skewed depending on the angle of rotation of primary arm 505 about axis 501. The skew can be undesirable, but can be compensated for by rotating secondary arm 550 in relation to arm 505 about axis 502.

Figure 5:
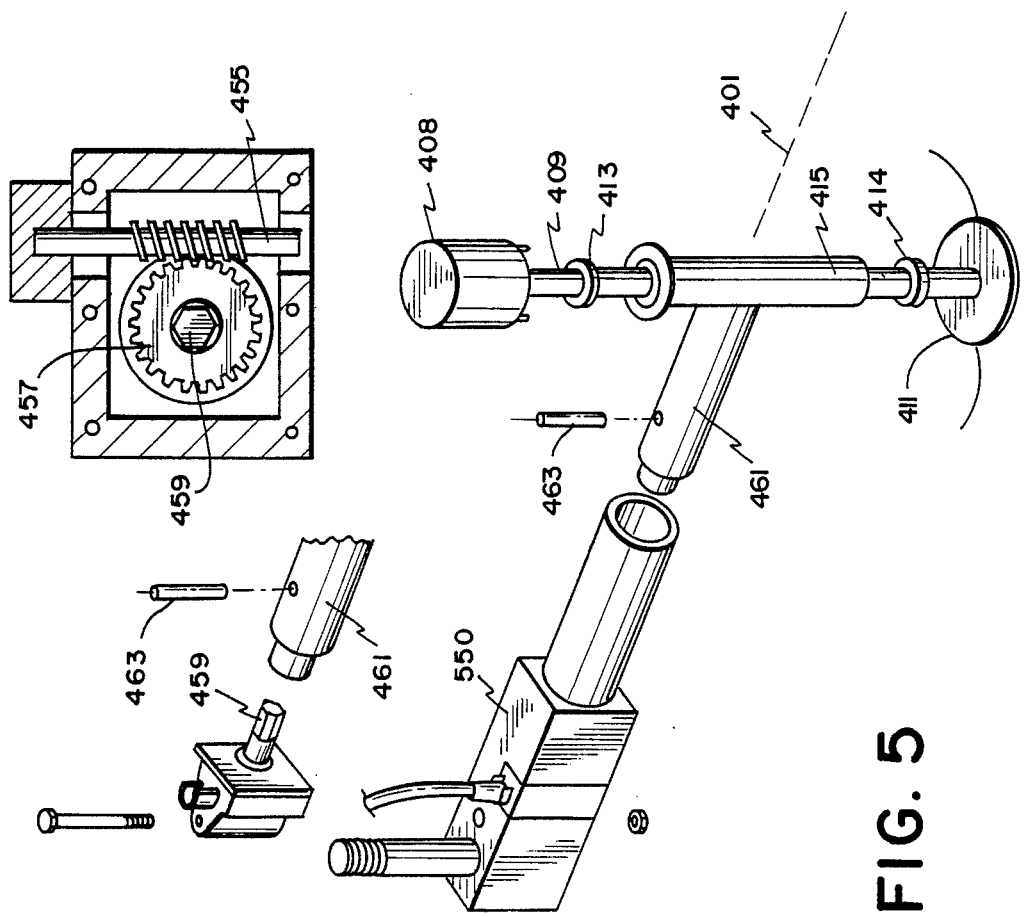
FIG. 5 is an exploded perspective view, partially cut-away, of the trimmer head assembly and its mounting to the support arm of the apparatus shown in FIG. 1.

As noted, the cutting angle of the trimmer head is primarily determined by rotation about axis 401. Details of how such rotation is achieved are best seen in FIG. 5 with general reference to FIG. 1. The cutting angle of trimmer head assembly 4 is controlled by positioning control lever 806 which activates an electric motor (not shown) which in turn rotates a flexible shaft 450. Shaft 450 is connected to a worm gear 455 which, when rotated, rotates gear 457 and shaft 459 which is connected thereto. Shaft 459 is removably connected to one end of shaft 461 by mating hexagon surfaces. The opposed end of shaft 461 is welded to the body 415 of the trimmer head assembly and is held in place within the body of secondary arm 550 by a roll pin 463.

Trimmer head assembly 4 includes a conventional electric motor 408 to provide operating power. The motor itself takes input power from the engine generator of the mower by wire connections (not shown). Shaft 409 which connects motor 408 to trimmer 411 runs on bearings 413, 414.

Figure 6:
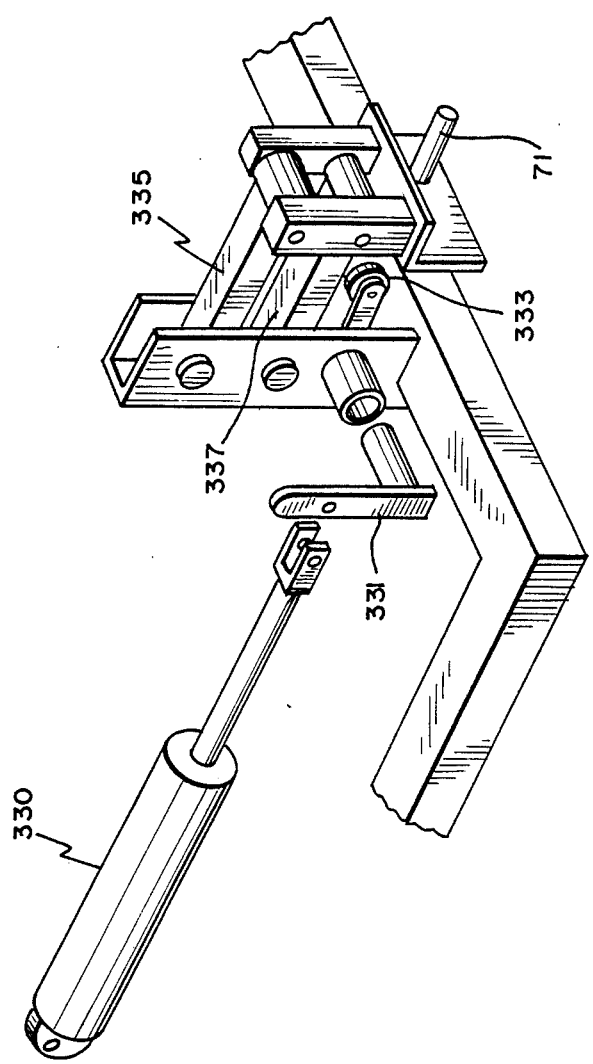
FIG. 6 is an exploded perspective view, partially cut-away, of the height adjustment mechanism for the apparatus shown in FIG. 1.

As is clear from FIG. 1, framework 2 supports not only the trimmer head assembly but also a mowing reel 3, the latter of which is operated by a motor 320 also carried by framework 2. Height adjustment of the entire framework is accomplished by moving lever 803 which is connected to a hydraulic control valve which activates hydraulic cylinder 330 shown in FIG. 6. When bell crank 331, connected to the cylinder, rotates anticlockwise in response, then roller 333 causes parallel members 335, 337 to move upwardly. Downward pressure is considered undesirable because reel 3 should be allowed to ride with roller 380, the latter of which is standard equipment on reel type mowers, but serves as a ground roller for the entire framework in the present case. The absence of downward pressure allows the reel to better follow the contour of a lawn.

Balanced by springs 280 and 282, framework 2 is pivotally mounted on bolt 71 which permits the framework to oscillate on irregular surfaces. Members 335, 337 maintain this bolt in a horizontal position regardless of height.

It will be readily apparent to those skilled in the art that a variety of modifications, changes and variations to the invention are possible within the spirit and scope of the following claims. The invention should not be considered as restricted to the specific embodiment described and illustrated with reference to the drawings.

I claim:

1. Lawn and garden trimmer apparatus, comprising:
   (a) supporting framework, and means for mounting said framework to a lawn mower body;
   (b) a guide rail supported longitudinally between opposed sides of said framework;
   (c) a carrier bracket movably mounted on said rail for longitudinal movement and positioning along the length of said rail;
   (d) a support arm having an inner and an outer end, said inner end being pivotally mounted to said bracket for rotation about a support arm access extending transfers to said rail;
   (e) a trimmer assembly mounted to said outer end of said arm; and
   (f) said support arm and said trimmer assembly being supported solely by said bracket and are free hanging therefrom.

2. Apparatus as defined in claim 1, wherein said trimmer assembly is pivotally mounted to said outer end for rotation about a trimmer assembly axis extending transverse to said support arm axis.

3. Apparatus as defined in claim 2, wherein said support arm is articulated at a point intermediate said inner end and said outer end for rotation about an axis laterally spaced from and extending parallel to said support arm axis.

4. Apparatus as defined in claim 1, wherein said support arm is rotatable about said support arm axis to reach beyond either given side of said framework when said bracket is positioned near the given side.

5. Apparatus as defined in claim 1, further including a mowing reel supported by said framework.

6. Apparatus as defined in claim 5, wherein said guide rail is pivotally mounted between said sides for rotation of said rail about said longitudinal axis.

7. Apparatus as defined in claim 6, wherein said means for mounting said framework to said lawn mover body includes means for adjusting the height of said framework in relation to said body.

* * * * *